United States Patent [19]
Takashima et al.

[11] Patent Number: 5,905,588
[45] Date of Patent: May 18, 1999

[54] OPTICAL TRANSMITTING DEVICE

[75] Inventors: Shin-ichi Takashima, Hiratsuka; Hideyuki Omura, Chigasaki; Kazuya Omae, Hiratsuka, all of Japan

[73] Assignee: The Furukawa Electric Co., Ltd., Tokyo, Japan

[21] Appl. No.: 08/636,537

[22] Filed: Apr. 23, 1996

[30] Foreign Application Priority Data

Sep. 26, 1995 [JP] Japan ................................. 7-247508

[51] Int. Cl.$^6$ ................................................. H04B 10/04
[52] U.S. Cl. ........................... 359/181; 359/167; 359/110
[58] Field of Search .................... 359/117, 120, 359/121, 157, 167, 177, 110, 181

[56] References Cited

U.S. PATENT DOCUMENTS

| | | | |
|---|---|---|---|
| 4,247,956 | 1/1981 | Christiansen et al. | 359/173 |
| 4,994,675 | 2/1991 | Levin et al. | 250/551 |
| 5,355,250 | 10/1994 | Grasso et al. | 359/341 |
| 5,428,471 | 6/1995 | McDermott | 359/177 |
| 5,485,296 | 1/1996 | Healey et al. | 359/112 |
| 5,487,120 | 1/1996 | Choy et al. | 385/24 |
| 5,642,450 | 6/1997 | Oda | 385/60 |

FOREIGN PATENT DOCUMENTS

| | | |
|---|---|---|
| 3-13909 | 1/1991 | Japan . |
| 6-177837 | 6/1994 | Japan . |

*Primary Examiner*—Rafael Bacares
*Attorney, Agent, or Firm*—Jacobson, Price, Holman & Stern, PLLC

[57] ABSTRACT

There is provided an optical transmitting device with which signal light can be blocked only in the optical path having a displaced or removed optical connector without affecting the remaining optical paths. An optical transmitting device comprises a light source 12 for producing signal light with a high-power level, an optical distributor 14 for distributing the signal light from the light source 12 to a plurality of optical paths and a plurality of optical output ports 18 connected to said optical distributor 14, wherein each of the plurality of optical paths is provided between the optical distributor 14 and the related optical output port 18 with an light blocking unit 26, an optical coupler 20 connected to said light blocking unit 26 for branching an optical path from the incoming optical path for reflected return light, an light/electricity converter 22 for converting the reflected return light into an electric signal and a control circuit 24 for driving the light blocking unit 26 according to the electric signal from said light/electricity converter 22.

1 Claim, 2 Drawing Sheets

OPTICAL TRANSMITTING DEVICE

BACKGROUND OF THE INVENTION

1. Field of the Invention

This invention relates to an optical transmitting device to be used for an optical fiber communication system in order to transmit optical signals with a high-output power level and, more particularly, it relates to an optical transmitting device designed to prevent optical signals being transmitted out of it along an optical path from being inadvertently emitted out of the optical path as any of the optical connectors of the system is displaced or removed.

2. Prior Art

An optical transmitting device for transmitting optical signals in an optical fiber communication system is typically designed to produce optical signals with a high-output power level so that the signals may travel over a long distance without being strained or lost.

Such a communication system operates well as long as the optical connectors are connected properly in the optical path. However, signal light can leak out with a high-power level and signals can be strained or lost once any of the connectors is displaced or dislocated.

Signal light with a high-power level can be dangerous to the human body particularly when it hits the eyes and, therefore, the operation of installing, replacing and removing connectors while high-power signal light is being transmitted cannot be carried out without providing some security and protection measures.

The most simple security measure that can be provided may be suspension of the operation of the optical transmitting device. However, suspension of the operation of the optical transmitting device entails blackout of all the transmission paths connected to the optical transmitting device, which can bring forth serious consequences.

In an attempt to avoid this problem, Japanese Patent Applications Laid-Open Nos. 3-13909 and 6-177837 disclose a technique of detecting the dislocation of an optical connector and automatically reducing the power level of the light source of the optical transmitting device so that leaked signal light, if any, may not damage the operator working at the optical connector where signal light is leaking.

However, with any of the techniques disclosed in the above patent documents, if the signal light output power level of an optical transmitting device having a plurality of optical output ports that are covered by a single light source is reduced, the output power level of the optical output ports having no optical paths with a displaced or removed optical connector are also reduced to consequently produce degraded signal light in every optical path.

In view of the above problem, it is therefore the object of the present invention to provide an optical transmitting device with which signal light can be blocked only in the optical path having a displaced or removed optical connector without affecting the remaining optical paths.

SUMMARY OF THE INVENTION

According to the invention, the above object is achieved by providing an optical transmitting device comprising a light source for producing signal light with a high-power level, an optical distributor for distributing the signal light from the light source to a plurality of optical paths and a plurality of optical output ports connected to said optical distributor, characterized in that each of said plurality of optical paths is provided between the optical distributor and the related optical output port with an light blocking unit, an optical coupler connected to said light blocking unit for branching an optical path from the incoming optical path for reflected return light, an light/electricity converter for converting the reflected return light into an electric signal and a control circuit for driving the light blocking unit according to the electric signal from said light/electricity converter.

For the purpose of the present invention, said optical distributor may be a waveguide type optical modulator.

For the purpose of the present invention, an optical modulator may be provided on each of the optical paths branched by the optical distributors.

For the purpose of the present invention, the optical modulators may operate also as light blocking units.

For the purpose of the present invention, the optical modulators may be electric field absorption type optical modulators.

Alternatively, for the purpose of the present invention, the optical modulators may be waveguide type optical modulators.

For the purpose of the present invention, the light blocking units comprise respective light switches.

DESCRIPTION OF THE PREFERRED EMBODIMENTS

Now, the present invention will be described by referring to the accompanying drawings that illustrate preferred embodiments of the invention.

(1st Embodiment)

Figure 1:
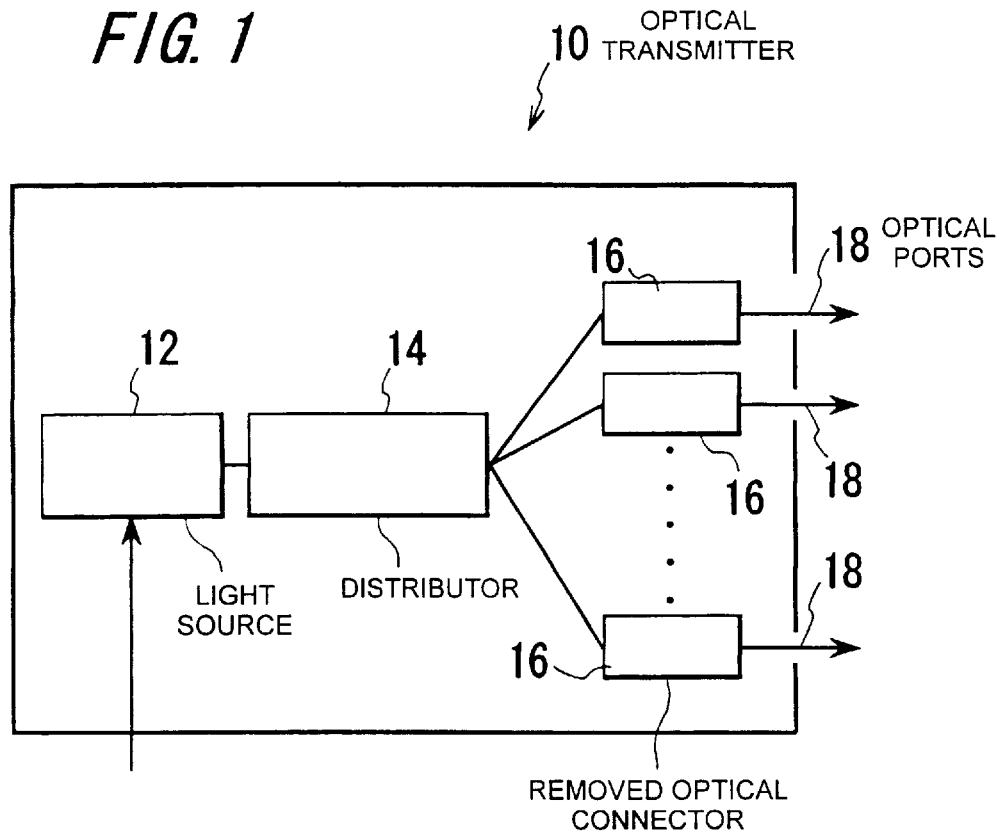
FIG. 1 is a schematic block diagram of an embodiment of optical transmitting device according to the invention.

FIG. 1 is a block diagram of a first embodiment of optical transmitting device according to the invention. The optical transmitting device 10 of FIG. 1 comprises a light source 12, an optical distributor 14, a safety arrangement for a displaced or removed optical connector 16 and an optical output port 18.

The light source 12 may typically be a high-output power DFB laser. The optical distributor 14 may typically be an optical fiber type directional coupler for branching a single optical path into N optical paths. The modulation signal from a signal source is applied to the light source 12.

Figure 2:
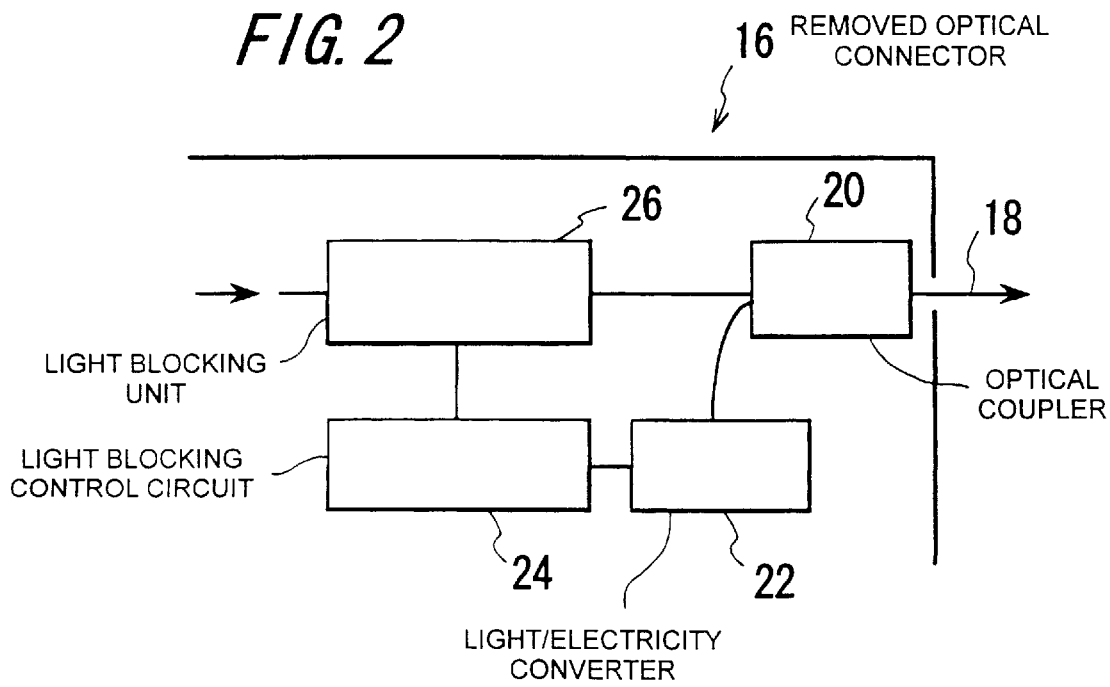
FIG. 2 is a schematic block diagram of a safety arrangement provided for the security of the optical transmitting device of FIG. 1 when a related optical connector is displaced or removed.

FIG. 2 shows a block diagram of the safety arrangement for a displaced or removed optical connector 16. The arrangement includes an optical coupler 20, an light/electricity converter 22, an light blocking unit control circuit 24 and an light blocking unit 26.

The optical coupler 20 branches an optical path from the incoming optical path for return light coming from another optical path (not shown) by way of the optical output port 18. It may typically be a 2×2 fused and tapered star coupler. The light/electricity converter 22 converts the reflected return light that is branched by the optical coupler 20 into an electric signal and may typically be a light receiving diode. The electric signal produced by the light/electricity converter 22 is then applied to the light blocking unit control circuit 24 so that the light blocking unit 26 is driven to operate according to the control signal provided by the control circuit 24.

The light blocking unit 26 may typically comprises a mechanical light switch, although the switch comprised in the light blocking unit 26 may not necessarily be a mechanical light switch but may be a waveguide type light switch.

With an optical transmitting device 10 provided with a safety arrangement as described above, if an optical connector arranged on one of the optical paths connected thereto is displaced or totally removed, the intensity of reflected return light abruptly increases at the optical connector. The reflected return light is then branched by the optical coupler 20 and enters the light/electricity converter 22 with an enhanced power level. Upon receiving an electric signal produced by the light/electricity converter 22 with a high-power level, the control circuit 24 for controlling the light blocking unit 26 operates the light switch of the latter to block the optical path there. Thus, the optical output of the output port of the displaced optical connector is blocked without reducing the optical output power level of the tight source.

Since the light source 12 is provided with a plurality of optical output ports 18, each of which is by turn provided with an independent light blocking unit 26, it may be seen that only the optical output of the optical output port 18 of the optical path on which an optical connector is displaced or removed is blocked so that the optical paths connected to the remaining optical output ports 18 are not blocked nor the output power level of those optical output ports 18 is not reduced to degrade the signals being transmitted.

(2nd Embodiment)

Figure 3:
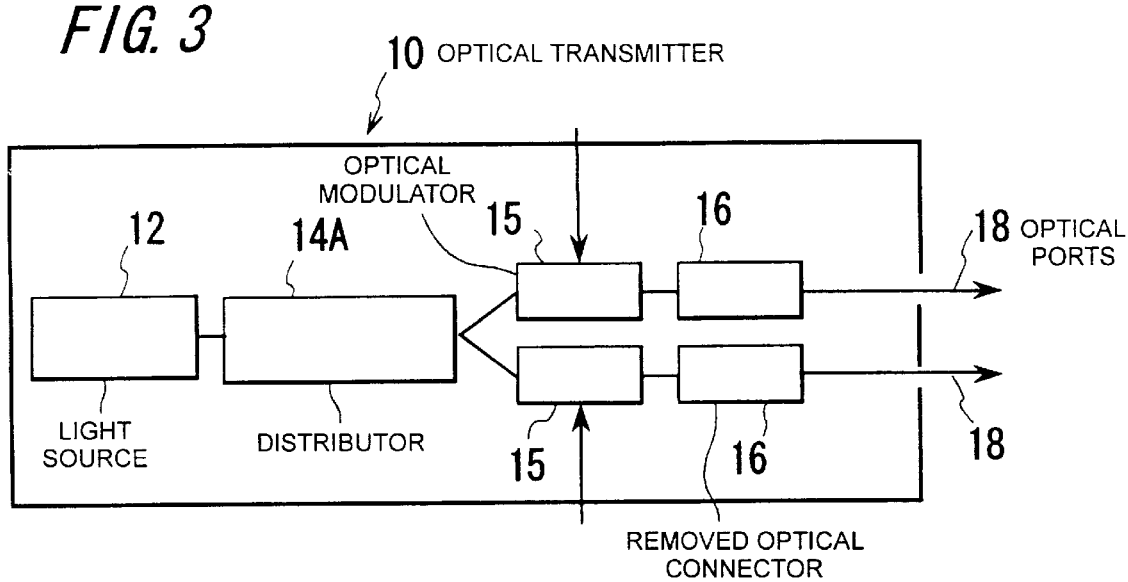
FIG. 3 is a schematic block diagram of another embodiment of optical transmitting device according to the invention.

FIG. 3 is a block diagram of a second embodiment of optical transmitting device according to the invention. The optical transmitting device 10A of FIG. 3 is basically similar to its counterpart of FIG. 1 but additionally comprises optical modulators 15 for modulating optical signals. With this arrangement, the modulation signal from a signal source is applied to each of the optical modulators 15. The light source 12 may typically be a high-output power DFB or YAG laser.

The optical modulator 15 may typically be a waveguide type or electric field absorption type optical modulator.

Otherwise, this embodiment is similar to the first embodiment and, therefore, the components of the two embodiments are denoted respectively by the same reference numerals and their description will be omitted.

(3rd Embodiment)

Figure 4:
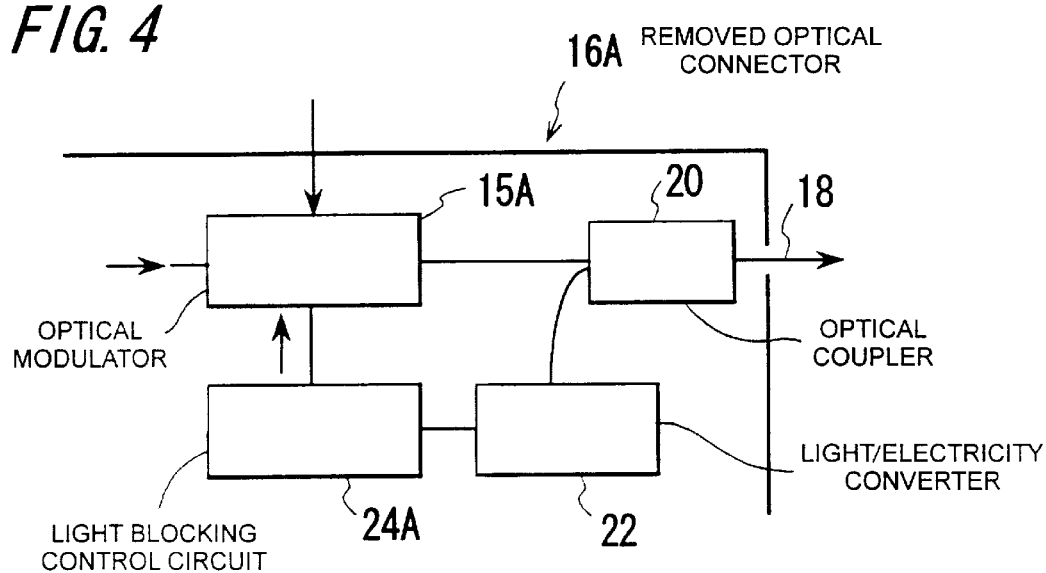
FIG. 4 is a schematic block diagram of a safety arrangement that can be used for the security of the optical transmitting device of FIG. 2 when a related optical connector is displaced or removed.

FIG. 4 is a schematic block diagram of a safety arrangement that can be used for the security of the embodiment of optical transmitting device of FIG. 2 when a related optical connector is displaced or removed.

Referring to FIG. 4, in the safety arrangement for a displaced or removed optical connector 16, an optical modulator 15A is disposed next to the optical distributor 14A. The optical modulator 15A may typically be a waveguide type or electric field absorption type optical modulator. In this case, the modulation signal from a signal source is applied to the optical modulator 15A. The optical coupler 20 and the light/electricity converter 22 of this embodiment are same as those of the first embodiment. Reference symbol 24A denotes a light blocking unit control circuit.

When a related optical connector is displaced or removed, the safety arrangement for a displaced or removed optical connector 16A of this embodiment can block the output light by modifying the bias voltage of the optical modulator 15A by means of the light blocking unit control circuit 24A. In other words, the optical modulator 15A of the safety arrangement for a displaced or removed optical connector 16A also operates as a light blocking unit and the use of an optical switch or the like is omitted.

(4th Embodiment)

Figure 5:
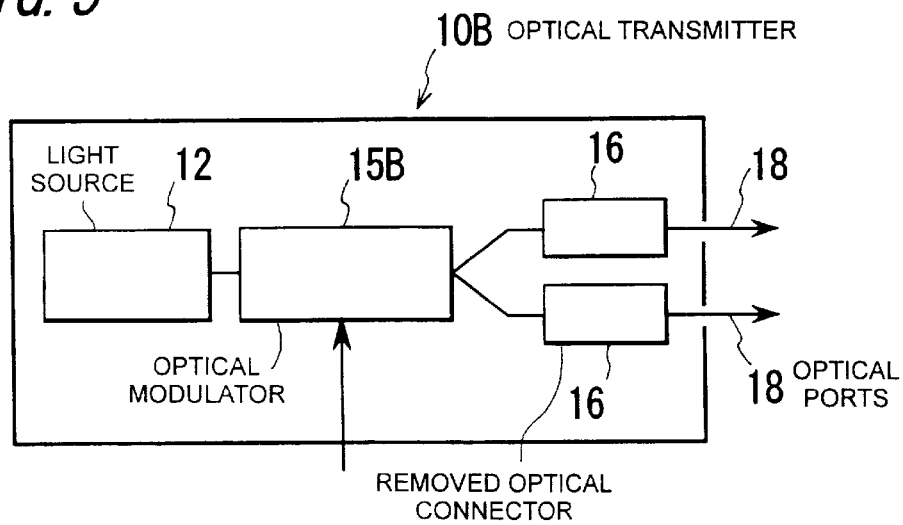
FIG. 5 is a schematic block diagram of still another embodiment of optical transmitting device according to the invention.

FIG. 5 is a schematic block diagram of still another embodiment of optical transmitting device according to the invention. In this embodiment of optical transmitting device 10B, there is provided an optical modulator 15B, which may typically be a waveguide type optical modulator, operates also as an optical distributor so that it directly divides the optical path into two branches. In this case the modulation signal from a signal source is applied to the waveguide type optical modulator 15B. The light source 12 may typically be a high output power DFB or YAG laser.

Since the operation and function of the safety arrangement for a displaced or removed optical connector 16 of this embodiment is identical with that of the first embodiment, it will not be described here any further.

It should be noted the safety arrangement for a displaced or removed optical connector 16A of the third embodiment can be used also for the optical transmitting device 10B of this embodiment, although, if such is the case, the modulation signal from a signal source is applied either to the optical modulator 15A or the optical modulator 15B.

As described above, according to the invention, there is provided an optical transmitting device with which the operation of removing and replace an optical connector disposed along an optical path connected thereto can be carried out without turning off the light source and without endangering the human body by output light with a high-output power level.

Additionally, signal light with a high-power output level is blocked only in the optical path having a displaced or removed optical connector without reducing the output power level of the signals on the remaining optical paths and degrading. Thus, the reliability of the optical communication system will be remarkably improved.

What is claimed is:

1. An optical transmitting device comprising a light source for producing signal light with a high-power level, an optical distributor for distributing the signal light from the light source to a plurality of optical paths and a plurality of optical output ports connected to said optical distributor, characterized in that each of said plurality of optical paths is provided between the optical distributor and the related optical output port with a light blocking unit, an optical coupler connected to said light blocking unit for branching an optical path from the incoming optical path for reflected return light, a light/electricity converter for converting the reflected return light into an electric signal and a control circuit for driving the light blocking unit according to the electric signal from said light/electricity converter, and further characterized in that an optical modulator is provided on each of the optical paths branched by the optical distributors and the optical modulators operate also as light blocking units.

* * * * *